Aug. 7, 1934.  A. RAPPL  1,969,094
FLUID OPERATED MOTOR
Filed Sept. 14, 1932  2 Sheets-Sheet 1
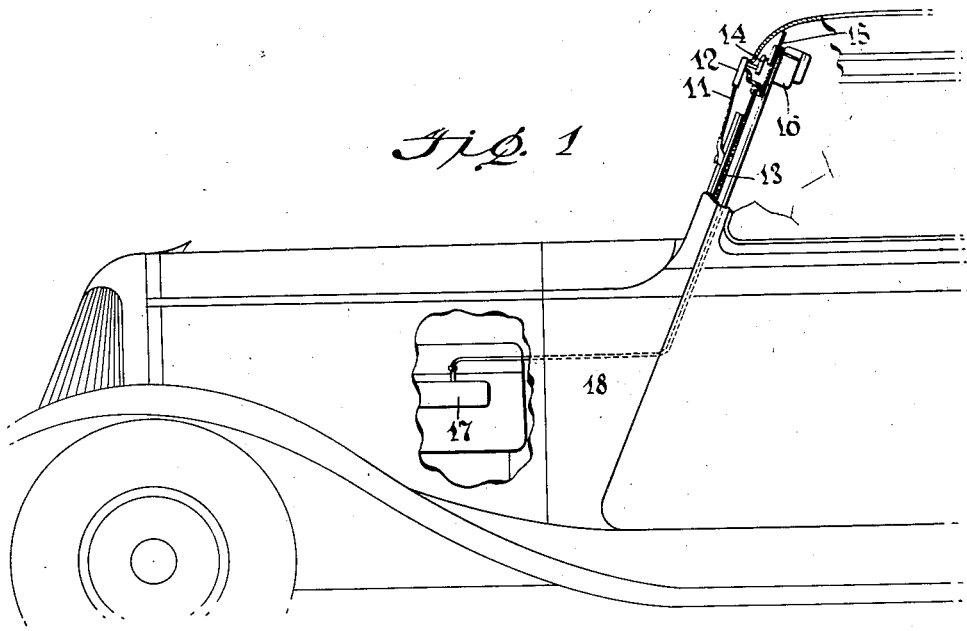
Fig. 1
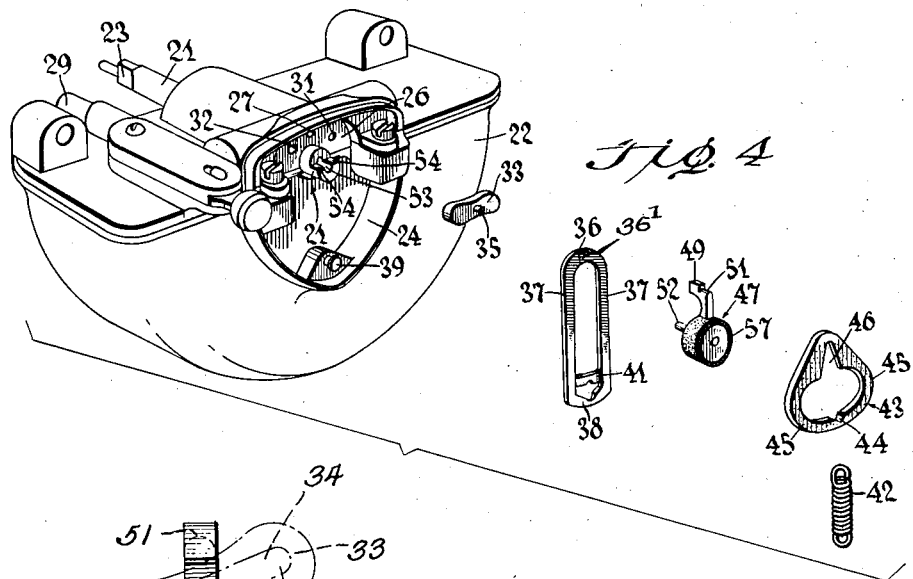
Fig. 4
Fig. 8
INVENTOR
Anton Rappl
BY Bean & Brooks ATTORNEYS Aug. 7, 1934.     A. RAPPL     1,969,094
FLUID OPERATED MOTOR
Filed Sept. 14, 1932    2 Sheets-Sheet 2
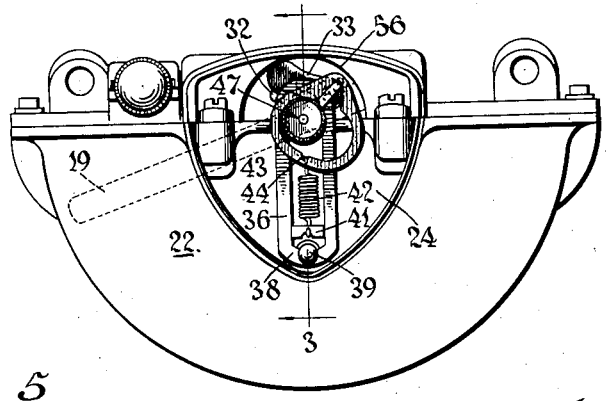
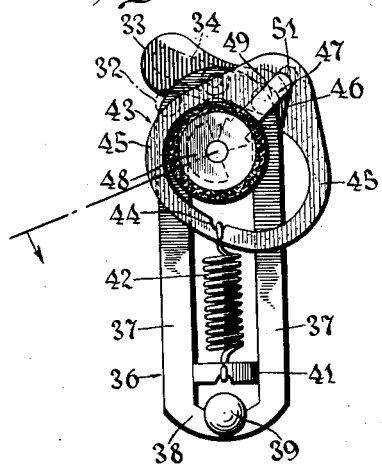
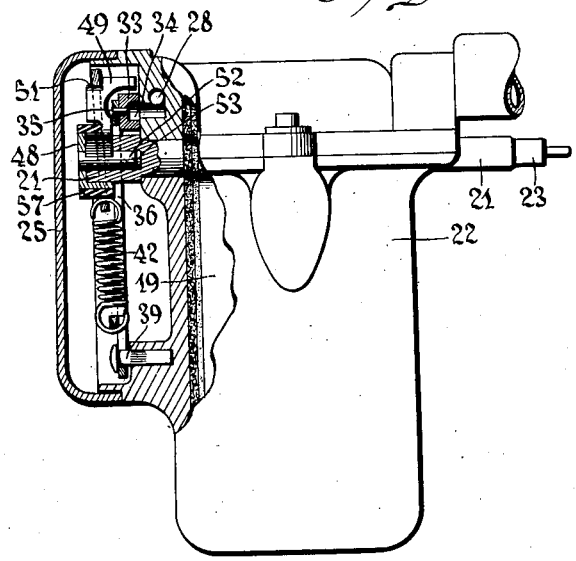
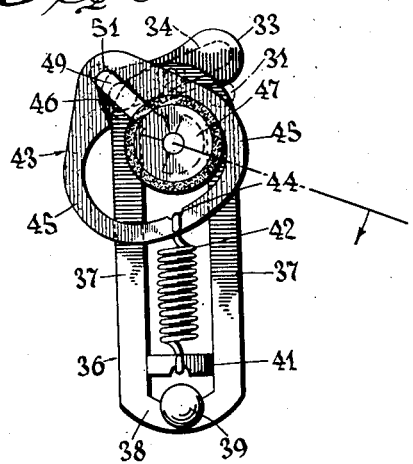
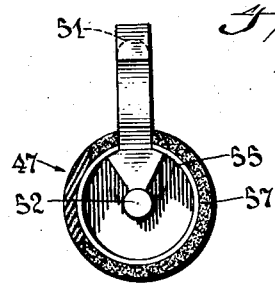
INVENTOR
Anton Rappl
BY Bean & Brooks, ATTORNEYS Patented Aug. 7, 1934

1,969,094

UNITED STATES PATENT OFFICE 1,969,094

FLUID OPERATED MOTOR

Anton Rappl, Buffalo, N. Y., assignor to Trico Products Corporation, Buffalo, N. Y.

Application September 14, 1932, Serial No. 633,182

14 Claims. (Cl. 121—97)

This invention relates primarily to valve actuating mechanism for fluid operated motors and particularly to such mechanisms which are adapted to be incorporated in the motors of fluid pressure or suction operated windshield cleaners.

Since windshield cleaner motors, and similar devices, are small and operate on a relatively small pressure differential, their valve mechanisms should be light and friction should be reduced to a minimum. However, such devices must be capable of sustained operation over relatively long periods of time, being subject during such periods to road shocks and engine vibrations. Accordingly, it is desirable that the valve and valve actuating mechanisms be as rugged and substantial as their light weight will permit.

The present invention contemplates an improved valve actuating mechanism, wherein the parts and arrangements of parts are simplified to such extent as to facilitate and expedite their manufacture and assembly, at the same time increasing their efficiency and ruggedness by reducing the masses of parts which have reciprocal movements and by reducing their areas of frictional contact with other parts.

These and other objects and advantages will become apparent from the following description of the typical embodiment of the invention illustrated in the accompanying drawings, wherein:

Fig. 1 is a side elevation of a motor vehicle, parts thereof being broken away to reveal the improved motor as applied to a vehicle for operating the windshield wiper thereof.

Fig. 2 is a front elevation of the windshield cleaner motor, depicting the valve actuating mechanism in its extreme position of clockwise movement.

Fig. 3 is a side elevation of the motor with parts thereof broken away substantially along line 3—3 of Fig. 2, and depicting the valve actuating mechanism moved from the position in Fig. 2 to a substantially dead-center position.

Fig. 4 is a perspective view of the cleaner motor shown in Fig. 2, and depicting the valve parts in disassembled relation.

Fig. 5 is an enlarged elevation of the valve actuating parts depicted in Fig. 2 and showing them in the relative position shown in Fig. 2.

Fig. 6 is a view similar to Fig. 5 but showing the parts in their limit position after counterclockwise movement.

Fig. 7 is an enlarged rear elevational view of a valve actuating part shown in Figs. 5 and 6 with a portion broken away; and Fig. 8 is a view similar to Fig. 7 but showing the end of the motor shaft operatively engaging the valve actuating part, the valve being indicated in one of its positions.

As shown in Fig. 1, a windshield wiper blade 11 may be supported by a wiper arm 12 for movement over the windshield 13 of a vehicle. The blade and arm are reciprocated in an arcuate path through the medium of suitable linkage 14, installed in the header 15 structure above the windshield, by a motor 16. The latter, in the illustrated embodiment, is of the suction type, being actuated by the withdrawal of air therefrom into the intake manifold 17 of the vehicle engine through the suction conduit 18.

The illustrated motor is of the vane piston type, in which a vane piston 19 secured to a shaft 21 oscillates the shaft by moving back and forth in the casing 22 about the axis of the shaft. The piston is moved by the alternate application of differential fluid pressures to the chambers on opposite sides of the piston. One end of the shaft protrudes from the casing and may be squared as indicated at 23, or otherwise formed, for connection to the wiper arm or arm actuating linkage. The opposite end of the shaft 21 extends into a valve chamber formed by recess 24 in the face of the casing 22 and by a dust cap 25 (shown in Fig. 3) detachably secured to the casing. On one side of the casing wall adjacent the shaft 21 is a valve seat 26 having a suction port 27 communicating with opening 28 extending through a nipple 29 connectible to the suction conduit 18, and a pair of ports 31, 32 communicating, respectively, with the chambers on the right and left of the piston 19, as they are depicted in Figs. 2, 4, 5, and 6. This port and valve arrangement may be of that construction illustrated in Patent No. 1,840,233 granted January 5, 1932, to Henry Hueber.

A valve 33 engages the valve seat and has a channel 34 continuously in communication with port 27 and in communication with either port 31 or port 32, depending upon the position to which it has been moved about the axis of pintle 35 carried by it. The pintle is adjacent the port 27 and engages in an opening 36' formed in a supporting frame or pressure plate 36, best illustrated in Fig. 4, and having spaced side portions 37 straddling the shaft 21 and a bottom portion 38 notched to seat against a pin 39 anchored to the casing. Between bottom portion 38 and the valve carrying portion and outwardly offset from the plane of said portion is a spring anchoring part 41 for attaching one end of a tension spring 42.

The opposite end of the spring engages a stirrup 43 at the point designated 44, the stirrup having arched sides 45 and a recessed portion 46 for engaging a kicker member 47. The latter includes a hub part or cup portion 48 seated on the end of shaft 21 and an arm 49 at its free end engageable with the valve 33. A seat 51, at the free end of the kicker for supporting the stirrup, preferably holds the latter offset outwardly from the spring anchoring part 41 of the pressure plate 36, so that an inward component of force is exerted on the kicker to retain it in place. As best shown in Figs. 3, 4 and 7, a pintle 52, carried by the hub of the kicker, is journalled in a bore 53 in the end of shaft 21. Shoulders 54 on the end of the shaft are adapted to engage a web 55 formed within the hub of the kicker. The shoulders 54 and web 55 are so proportioned that appreciable relative angular movement is permitted between the shoulders 54 and kicker 47.

In operation, when the shaft 21 moves in a clockwise direction (Fig. 6), due to the presence of suction to the left of the vane piston and atmospheric pressure to right of the piston, and approaches its limit position of such movement, the left shoulder 54 (shown in Fig. 4) will engage web 55 of the hub of the kicker, so that the latter will be carried with the shaft. As the kicker moves the stirrup 45 will be moved to tension the spring 42, the latter being expanded until the kicker and stirrup pass over dead center position (the position in which seat 51 of the kicker, the axis of shaft 21 and spring 42 are in alignment). At this time the spring will snap the stirrup and kicker to the position shown in Figs. 2 and 5, and the kicker arm 49 will simultaneously move the valve 33 to a position wherein the ports 27 and 31 will be placed in communication through channel 34 of the valve while port 32 will be opened to the atmosphere.

At this time suction will be caused to prevail on the right of piston 19 and atmospheric pressure on the left, resulting in the piston and shaft 21 moving in a counter-clockwise direction. As the limit position of such movement is approached, the right hand shoulder 54 of shaft 21 will engage the web 55 of the kicker. Thereupon the kicker will move with the shaft until the stirrup and kicker pass over dead center position, when the spring 42 will snap them to the position shown in Fig. 6, the arm 49 of the kicker simultaneously engaging the valve 33 and moving it to the position wherein ports 27 and 32 are placed in communication and port 31 is opened to the atmosphere. As a result of this action suction will maintain to the left of the piston and atmospheric pressure to the right; and another cycle of operation is commenced.

As the valve 33 is oscillated it is constantly held against its seat by the supporting or pressure plate 36 under the action of spring 42. As shown in Fig. 3 the spring 42 inclines outwardly (to the left) so that the upward pull of the spring on the anchoring part or strut 41 is at a divergence so as to tend to swing the upper end of the frame 37 toward the valve seat (to the right in Fig. 3), and thereby lightly urge the valve onto its seat. To increase this urge the strut 41 is offset slightly out of the plane of the frame 37. The lower end of the frame is merely engaged over the anchoring pin 39 and has a slight play in such connection sufficient to permit of the upper end of the frame swinging toward the valve seat under the urge of the spring 42.

The kicker arm 49' is so related to the valve that it may move free of the valve to beyond its dead center position, in order that the valve will not be moved except by snap action of the spring 42, thereby eliminating possibility of the mechanism stopping with the valve out of register with both ports 31, 32. To bring about this action and to insure quick reversal of valve, the upper surface of the latter is preferably of the cam shape illustrated. Further, to insure that the valve is not moved beyond a position in register with the ports 31, 32, the wall 56 of the recess 24 of the casing is extended to abut and provide a stop for the valve, as shown in Fig. 2.

As the spring 42 is comparatively short so that it is desirable to limit its expansion, and, as the side portions 37 of the pressure plate 36 are spaced only the width of shaft 22 in order that the latter may serve to hold the plate 36 against displacement, it is desirable to limit the angular movement of the spring, the side arch portions 45 of the stirrup are designed to engage the hub of the kicker. To obviate any clicking of these parts as the stirrup is snapped from side to side, a ring 57 of rubber, or like shock and sound absorbing material, is secured about the hub.

It will be understood that by reason of the construction described, the valve will move only about the axis of its pintle 35 without substantial movement of its center of gravity, thereby decreasing the friction and inertia to be overcome in valve constructions heretofore used in this art wherein the valves have had considerable translational movement. It will further be understood that many of the advantages obtained are the result of the principles involved, and that the latter may be embodied in devices having different structural arrangements and details than those disclosed herein, all within the purview of this invention.

What is claimed is:

1. In a motor having a casing and a piston relatively movable under a differential fluid pressure, and a shaft oscillated by the piston, said shaft having an axial bore in one end and a pair of spaced shoulders projecting in an axial direction, said casing having a valve seat with ports therein leading into the casing at opposite sides of the piston, a supporting frame mounted on the casing, a valve pivoted to the frame for oscillation about an axis substantially parallel to said shaft, a kicker having a pintle in said axial bore of the shaft and movable by said shoulders upon oscillation of the shaft, said kicker having a portion engageable with the valve for oscillating it about its pivot axis, a stirrup straddling the shaft and kicker and engaged with the free end of the latter, and spring means connecting the stirrup and supporting frame for urging the kicker to one side or the other of dead center position and for urging the frame toward the valve seat to hold the valve seated thereon.

2. In a motor having a casing and a piston relatively movable therein under a differential fluid pressure, and a shaft oscillated by the piston, said casing having a valve seat with a central port and a pair of ports disposed on substantially opposite sides of the central port, a valve seating on said seat and having a recess constantly communicating with the central port, a member for supporting the valve and a pivot connection between the valve and supporting member, said pivot connection having a pivot axis substantially axial of the central port, and means operated by the shaft for oscillating the valve about said pivot axis to cause the recess of the valve to alternately register with one and then the other of said pair of ports.

3. In a motor having a casing and a piston relatively movable therein under a differential fluid pressure, and a shaft oscillated by the piston, said casing having a valve seat with a central port and a pair of ports disposed on substantially opposite sides of the central port, a valve seating on said seat and having a recess constantly communicating with the central port, a member for supporting the valve and a pivot connection between the valve and supporting member, said pivot connection having a pivot axis substantially axial of the central port, means operated by the shaft for oscillating the valve about said pivot axis to cause the recess of the valve to alternately register with one and then the other of said pair of ports, and a wall portion extended from the casing for abutment by the valve when in its limit position.

4. In a motor having a casing and a piston movable therein under a differential fluid pressure, and a shaft oscillated by the piston, said casing having a valve seat with valve ports, a valve mounted for oscillation on said seat about an axis substantially parallel to the axis of said shaft, and a kicker oscillatable about the axis of said shaft and actuated by said shaft, said kicker having a portion engaging the valve as the kicker approaches its limit positions of movement for oscillating the valve about said first mentioned axis.

5. A valve mechanism for fluid motors, comprising a valve seat, a valve thereon oscillatable about its axis between two positions, a pressure plate having a part pivotally supporting the valve and movable to urge the valve to its seat, a kicker movable about an axis spaced from the first mentioned axis and between two operative positions for actuating the valve, means for imparting movement to the kicker, and resilient means connected at one end to the pressure plate and at its opposite end to the kicker for moving the latter after a predetermined movement by said first means, said resilient means acting on the pressure plate to urge said part thereof against the valve.

6. A valve mechanism for fluid motors comprising a valve movable about an axis of oscillation between two positions on its seat, a kicker for operating the valve, an actuator for the kicker movable about an axis of oscillation spaced from said first axis and having a play connection with the kicker permitting limited independent movement of the kicker, resilient means acting to accelerate the movement of the kicker following a predetermined initial movement imparted to the kicker by the actuator, said actuator having an opening and said kicker having a pintle pivotally engaged in the opening of the actuator.

7. A valve mechanism for fluid motors comprising a valve movable about an axis of oscillation between two positions on its seat, a kicker for operating the valve, an actuator for the kicker movable about an axis of oscillation spaced from said first axis and having a play connection with the kicker permitting limited independent movement of the latter, resilient means acting to accelerate the movement of the kicker following a predetermined initial movement imparted to the kicker by the actuator, said valve having a cam surface and said kicker having a part extending into adjacency with said surface to engage the same and move the valve as the kicker approaches its limit positions, said actuator having an opening and said kicker having a pintle pivoting in the actuator opening, and said resilient means acting to retain the arm and pintle in operative relationship with the valve and actuator respectively.

8. In a valve mechanism for fluid motors having an oscillatable shaft and a valve movable between two positions on a valve seat, a kicker for the valve, said kicker having a hub freely mounted on said shaft, means between said hub and said shaft whereby said shaft oscillates said kicker subsequent to an idling movement, said hub having means for engaging and moving said valve from one to the other of said positions, and means for accelerating the movement of said kicker.

9. In a valve mechanism for fluid motors having an oscillatable shaft and a valve movable between two positions on a valve seat, a kicker for the valve, said kicker having a cup portion freely mounted on the end of said shaft, means between said cup and said shaft whereby said shaft oscillates said kicker subsequent to an idling movement of said shaft, said cup having means for engaging and moving said valve from one to the other of said positions, means for maintaining said kicker on said shaft and for accelerating the movement of said kicker, and resilient means between said cup and said accelerating means.

10. A valve mechanism for fluid motors, comprising a valve movable back and forth on a seat between two positions, a kicker for operating the valve, an actuator for the kicker, resilient means for accelerating the kicker after a predetermined movement thereof by the actuator, said kicker being pivoted intermediate its ends and operatively connected at one end to the valve, said resilient means comprising a stirrup pivoting on the free end of the kicker and having parts spaced by a central opening through which the actuator extends, and a spring anchored at one end and connected to the stirrup for acting on the kicker to provide said acceleration, and a shock absorbing member disposed about the actuator, said spaced parts of the stirrup alternately engaging said shock absorbing member to limit the movement of the stirrup.

11. A valve mechanism for fluid motors, comprising a valve movable about an axis of oscillation on a seat between two positions, a kicker for operating the valve, an actuator for the kicker, resilient means for accelerating the kicker after a predetermined movement thereof by the actuator, and a pressure member having pivotal connection to the valve for supporting the valve, said pressure member receiving support from a mounting part and adapted for movement urging the valve toward its seat, said resilient means acting on the pressure member to place the valve under a yielding pressure.

12. A valve mechanism for fluid motors, comprising a valve movable back and forth on a seat between two positions, a kicker for operating the valve, an actuator for the kicker, a valve supporting member detachably suspended at one end and at its other end pivoted to the valve and bearing on the valve to urge the latter to its seat, said kicker being pivotally mounted on the actuator and having a part extending radially from the actuator, said supporting member adjacent its suspension having a bracket part, and resilient means connecting said bracket part to said kicker part to accelerate movement of the kicker after a predetermined movement thereof by the actuator, and said resilient means holding the supporting member on its suspension and the kicker on its axis and actuating both during the operation of the valve mechanism.

13. In a motor having a casing and piston relatively movable under a differential fluid pressure, and a shaft oscillated by the movable one of said elements; said shaft having an axial bore in one end with a pair of shoulders, said casing having a valve seat with ports therein leading into the casing at opposite sides of the piston, a pivoted valve movable on the valve seat from one operative position to another operative position for operatively connecting the ports to a source of fluid pressure, a combined valve seating and supporting member pivoted to the valve and suspended at one end, said supporting member bearing at its opposite end on the valve to hold the latter on its seat, said supporting member having spaced parts engaging the shaft for guided movement thereon about its point of suspension, a kicker having a stem pivotally received in the bore of the shaft and adapted to be engaged and actuated by the shoulders thereof for limited movement, said shoulders having a play connection with the kicker and said kicker having a play connection with the valve, a stirrup having one end engaging the free end of the kicker, and spring means connecting the other end of the stirrup to the supporting member and functioning dually first to move the stirrup and kicker subsequent to an initial movement of the kicker by the shaft shoulders, and second to exert a pressure on the supporting member for urging the valve to its seat.

14. A valve mechanism for fluid motors, comprising a valve movable about a pivot axis on a seat between two positions, a kicker for operating the valve, an actuator for the kicker, resilient means for accelerating the kicker after a predetermined movement thereof by the actuator, and a pressure plate having a pivot connection to the valve for supporting the valve and for holding it to its seat, said pressure plate having spaced parts engaging the actuator for guiding the pressure member, and resilient means acting on the pressure member to urge it toward the valve to hold the latter against its seat.

ANTON RAPPL.